US006973151B2

(12) United States Patent
Lysdal et al.

(10) Patent No.: US 6,973,151 B2
(45) Date of Patent: Dec. 6, 2005

(54) DYNAMIC PHASE ALIGNING INTERFACE

(75) Inventors: Henning Lysdal, Roskilde (DK);
Eivind Johansen, Skoulunde (DK)

(73) Assignee: Intel Corporation, Santa Clara, CA (US)

( * ) Notice: Subject to any disclaimer, the term of this patent is extended or adjusted under 35 U.S.C. 154(b) by 814 days.

(21) Appl. No.: 09/893,217

(22) Filed: Jun. 26, 2001

(65) Prior Publication Data

US 2002/0110212 A1 Aug. 15, 2002

Related U.S. Application Data

(60) Provisional application No. 60/289,555, filed on May 8, 2001, provisional application No. 60/269,229, filed on Feb. 15, 2001.

(51) Int. Cl.[7] .............................................. H04L 25/00

(52) U.S. Cl. ....................... 375/371; 375/372; 375/354; 370/503; 370/419

(58) Field of Search ............................... 375/371, 372, 375/354; 370/516, 503, 419; 713/401

(56) References Cited

U.S. PATENT DOCUMENTS

| | | | | |
|---|---|---|---|---|
| 5,526,359 | A | * | 6/1996 | Read et al. ................... 370/516 |
| 6,219,395 | B1 | * | 4/2001 | Pollack et al. ............... 375/371 |
| 6,725,390 | B1 | * | 4/2004 | Liu et al. ...................... 713/401 |
| 2002/0071510 | A1 | * | 6/2002 | Drerup et al. ............... 375/371 |

* cited by examiner

*Primary Examiner*—Shuwang Liu
*Assistant Examiner*—Eva Zheng
(74) *Attorney, Agent, or Firm*—Blakely, Sokoloff, Taylor & Zafman LLP

(57) ABSTRACT

According one embodiment, an apparatus and method are disclosed for a dynamic phase aligning input interface. In the embodiment, a first device provides data to a second device. According to the embodiment, the interface is counter clocked, the second device being clocked by a first clock signal and providing a second clock signal source to the first device for clocking the data. The first device transmits the second clock signal and the data to the second device, with the second clock signal being delayed by the period of time required for the second clock signal source to propagate through the first device. The second device detects the phase of the first clock signal and the second clock signal and modifies the phase of the second clock signal source to align the phase of the first clock signal and the phase of the second clock signal.

29 Claims, 4 Drawing Sheets

Embodiment of Interface
Without FIFO Buffer

Figure 1  Phase Alignment Process

Embodiment of Interface Without FIFO Buffer

DYNAMIC PHASE ALIGNING INTERFACE

This application claims priority to U.S. Provisional Application No. 60/269,229, filed Feb. 15, 2001, and U.S. Provisional Application No. 60/289,555, filed May 8, 2001.

FIELD OF THE INVENTION

This invention relates to communication systems in general, and more specifically to a method and apparatus for a dynamic phase aligning interface.

BACKGROUND OF THE INVENTION

In a digital interface between two devices, data often is accompanied by a clock signal. In many instances the device that is transmitting the data is also the source of the clock signal. However, in certain instances the receiving device is the source of the clock signal, in which case the interface is said to be counter clocked. A counter clocked interface creates different design considerations than other clock arrangements. The clock signal received by the second device is delayed by the time that it takes for the clock signal source to propagate through the first device. In this case, there is no known relationship between the data and the clock signal that can be used to determine proper clocking relationships. Violations may occur in set-up time (the amount of time before the active edge of a clock signal that input data must be held to ensure the data is valid) and in hold time (the amount of time after the active edge of a clock signal that input data must be held to ensure it is valid). For this reason, transmitted data may be sampled incorrectly in a counter clocked interface.

In conventional counter clocked systems, a FIFO (first in, first out) buffer may be used to absorb clock signal variation. Using a FIFO buffer, the data may be written according to the clock of the transmitting device and read according to the clock of the receiving device. However, the use of a FIFO buffer generally requires a significant amount of logic. In conventional systems including a FIFO buffer, the buffer is placed in the device that is receiving the data. If the device receiving the data is a high speed device, there are substantial costs involved in including the logic required for the buffer.

In operating a conventional system utilizing a FIFO buffer, there is a need for a buffer pointer and connected pointer control logic for the operation of the buffer. For proper operation, the buffer logic must ensure that reading and writing timing problems are addressed and must ensure that there are no overflow conditions in the buffer. To reset or initialize the buffer, a conventional system requires control handshaking between the devices. A buffer is generally of limited size and to establish the needed size of the buffer, the potential difference in time caused by the round-trip propagation delay in the counter clocked clock signal source must be estimated, creating further design concerns.

BRIEF DESCRIPTION OF THE DRAWINGS

The appended claims set forth the features of the invention with particularity. The invention, together with its advantages, may be best understood from the following detailed descriptions taken in conjunction with the accompanying drawings, of which:

DETAILED DESCRIPTION

Figure 1:
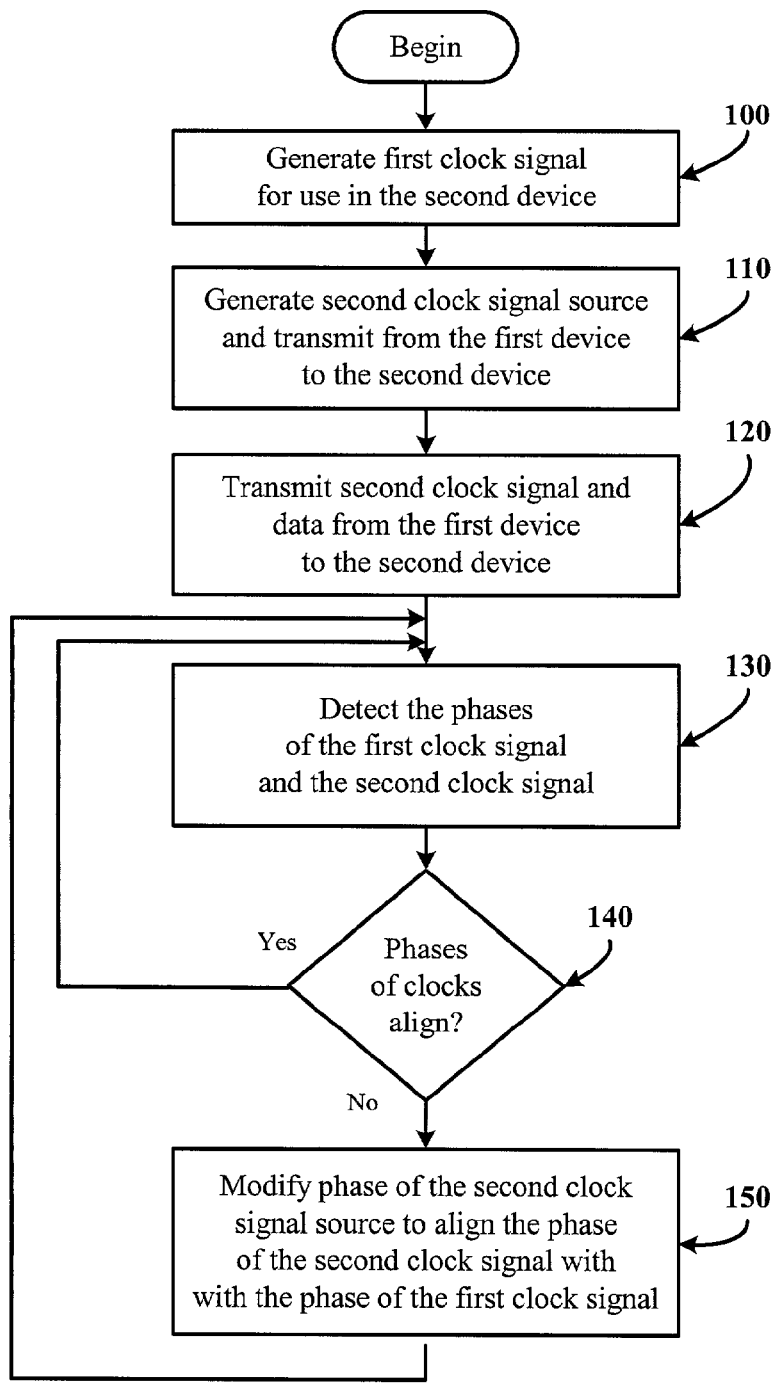
FIG. 1 is a flowchart illustrating the process of phase alignment in a particular embodiment.

A method and apparatus are described for a dynamic phase aligning interface.

In the following description, for the purposes of explanation, numerous specific details are set forth in order to provide a thorough understanding of the present invention. However, it will be apparent to one skilled in the art that the present invention may be practiced without some of these specific details. In other instances, well-known structures and devices are shown in block diagram form.

The present invention includes various processes, which will be described below. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

This application describes a method and apparatus for a phase aligning input interface. Under an embodiment of the invention, data is transmitted from a first device to a second device. Some portion of the second device is clocked by a first clock signal. The second device provides the source for a second clock signal for clocking the data, which then is delayed by a period of time as the second clock propagates through the first device (the clock-out to data-in delay). Under an embodiment, the first device is a high-speed device and the second device is a slower device. The round-trip delay variations through the low speed device may create difficulty in meeting the input setup and hold times of the high-speed device. Note that while this description refers to a first device and a second device for simplicity, the first and second devices may be subsystems in a larger device or system or may be other types of subparts or components that are interfaced together.

The implementation agreement of the Optical Internetworking Forum regarding the interface between SONET (synchronous optical network) framer and serializer/deserializer parts is related to digital interface systems. (OIF-SFI4-01.0, Proposal for a common Electrical Interface Between SONET Framer and Serializer/Deserializer Parts for OC-192 Interfaces, dated Sep. 26, 2000) In such agreement, it is provided that the transmitter (the second device receiving the data) shall preferably provide means to absorb the delay variance between the framer clock source input (referred to as TXCLK_SRC) and the clock signal output (referred to as TXCLK). However, a method for absorbing the delay variance is not provided in such implementation agreement.

Under an embodiment of an interface between a first device and a second device, the phase of the first clock signal and the phase of the second clock signal are determined and the phase of the second clock signal source is adjusted to compensate for variation between the phases of the first and second clock signals. In an embodiment, the second device utilizes a phase frequency detector (PFD) to determine the phase and frequency of the clock signals. In a particular embodiment, the phase frequency detector may be a set-reset (SR) latch based phase frequency detector. In one embodiment, the adjustment in phase may be accomplished by modifying the frequency of the second clock signal source. According to the embodiment, the phases of the clock signals are monitored during operation and the phase of the second clock signal source is dynamically modified to maintain alignment of the phase of the second clock signal with the phase of the first clock signal whenever the phase of the second clock signal drifts away from the phase of the first clock signal.

An advantage of dynamic phase alignment in a digital interface over conventional systems is that an embodiment of a dynamic phase alignment system may require less logic in the device receiving the data (the second device) than conventional systems that utilize a FIFO buffer. In some embodiments of dynamic phase alignment, no FIFO buffer is implemented for the transmission of data. If a FIFO buffer is used, the buffer may be placed in the first device that transmitting the data to the second device, rather than placing such logic in the second device. The use of dynamic phase alignment thus provides a better partitioning of function in a communication system. This allows a reduction in cost when, for example, the receiving device is a relatively expensive high-speed analog device and the transmitting device is a relatively inexpensive CMOS device.

A further advantage of dynamic phase alignment is that an embodiment may be immune to any variation in the clock-out to data-in delay. This provides a significant improvement over a conventional FIFO-based system, where the tolerance to delay is limited by the depth of the FIFO buffer that is implemented in the system.

If no FIFO buffer is implemented in an embodiment, there is a further advantage regarding initialization of the devices. If there is no buffer, the first device and second device can begin the transfer of data without an initiation sequence to initialize the buffer. The elimination of this initialization sequence thereby eliminates the control logic and signal pins associated with an initialization sequence.

FIG. 1 is a block diagram illustrating an embodiment of the process of dynamically phase aligning a digital interface between a first device that is transmitting data and to a second device. According to the embodiment, a first clock signal is generated for use of the second device, process block 100. The second device may be a high speed analog device. A second clock signal source is generated and is transmitted from the second device to the first device, process block 110, thus providing a counter clocked interface. The second clock signal then is transmitted from the first device to the second device together with the data, process block 120. The second clock signal will be delayed because of the propagation time through the first device. Upon receiving the second clock signal from the transmitting device, the receiving device detects the phases of the first and second clock signals, process block 130, and compares the phases to each other, process block 140. If the phases are in alignment, the process continues to detect the clock phases, process block 130, in order to monitor any changes in the relative clock signal phases. If the phases are not in alignment, the phase of the second clock signal is modified such that the phases of the first clock signal and the second clock signal are in alignment, process block 150. The phase of the second clock may be modified by, for example, modifying the frequency of the second clock or implementing an adjustable delay. Subsequent to modifying the phase of the second clock signal, the process continues to detect the clock signal phases, process block 130.

Figure 2:
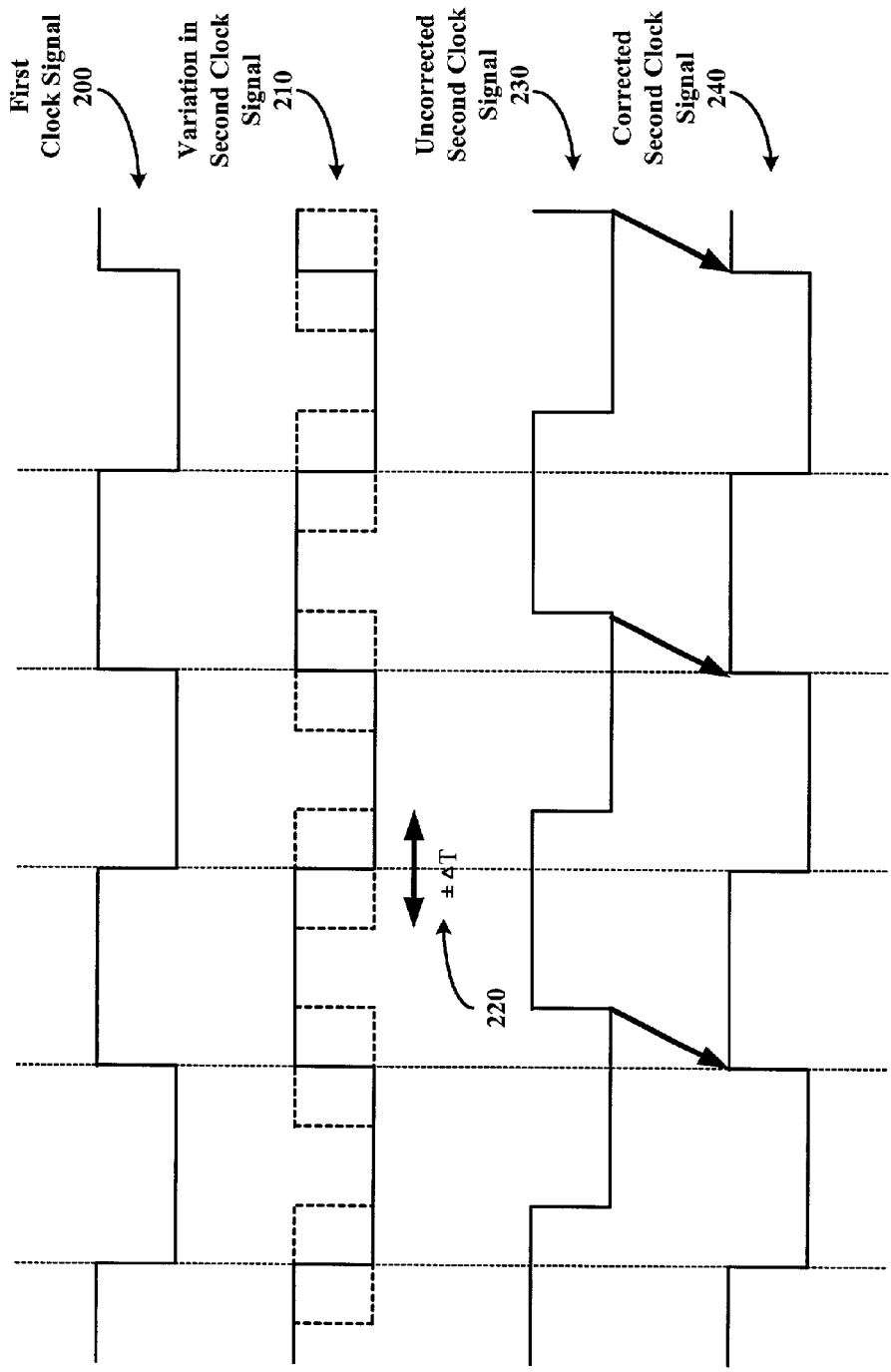
FIG. 2 is a timing diagram illustrating alignment of clock signals under an embodiment.

FIG. 2 is a timing diagram of clock signal phases to illustrate an embodiment of a dynamic phase aligning process. A first clock signal 200 has a given phase. A second clock signal 210 will initially have a phase that may vary in time by a factor of $\pm\Delta T$ 220. An example of an uncorrected second clock signal 230 is shown in FIG. 2. In this particular example, the uncorrected second clock signal 230 lags the first clock signal 200 by $\Delta T$. In the example, the frequency of the source of the second clock signal would be modified such that the phase of a corrected second clock signal 240 is aligned with the phase of the first clock signal 200. The dynamic phase alignment process would continue to monitor the phases of the first and second clock signals and to modify the source of the second clock signal as necessary to maintain alignment of the corrected second clock signal 230 with the first clock signal 200.

Figure 3:
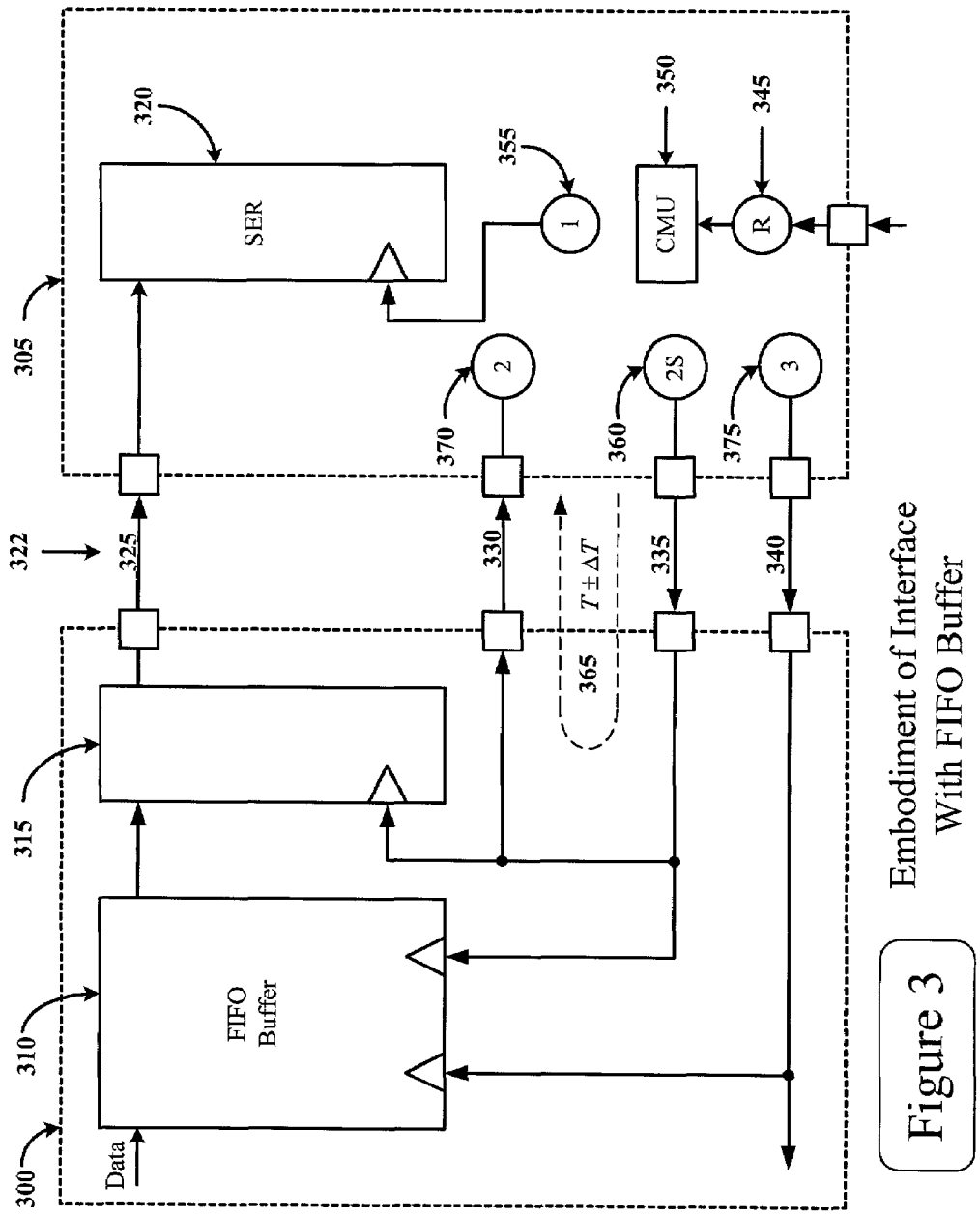
FIG. 3 is a diagram of a system embodiment that includes a FIFO buffer.

An embodiment of an interface with a FIFO buffer is shown in FIG. 3. A first device 300 is interfaced with a second device 305. In this embodiment, the first device may be a SONET/SDH (synchronous optical network/synchronous digital hierarchy) framer and the second device may be a serializer-deserializer (SERDES). In this particular embodiment, first device 300 includes a FIFO buffer 310 and a control unit 315. In the embodiment, second device 305 includes a serializer unit 320. The interface 322 between first device 300 and second device 305 includes a data connection 325, which the first device 300 utilizes to transmit data to the second device 305. Note that while FIG. 3 only illustrates the data being transmitted from the first device to the second device, data may also be transmitted from the second device to the first device. The interface further includes a first clock connection 330, a second clock connection 335, and a third clock connection 340. Note that third clock connection 340 may be omitted in many embodiments. For example, third clock connection 340 may be omitted if the core clock (used for FIFO write operations) for first device 300 is frequency locked with a reference clock of second device 305.

In FIG. 3, second device 305 also receives an external reference clock 345, which second device 305 may use to generate clock signals through the use of a clock multiplier unit 350. Note the use of an external reference clock is not required and that an embodiment of dynamic phase alignment may be operated regardless of the method in which the core clock of second device 305 is generated. Most commonly the core clock of second device 305 is generated by locking a voltage controlled oscillator to an external reference. In the embodiment shown in FIG. 3, serializer unit 320 is clocked by a first clock signal 355. Second device 305 then transmits a second clock signal source 360 to first device 300 using second clock connection 335. After second clock signal source 360 propagates through first device 300, a second clock signal 370 then is transmitted back from first device 300 to second device 305 using first clock connection 330. As second clock signal source 360 propagates through first device 300, there is a propagation delay 365 (a clock-out to data-in delay) of $T\pm\Delta T$. Second clock signal 370 as received by the second device through clock connection 330 is delayed by a time period of $T\pm\Delta T$. In the description of this embodiment, $\pm\Delta T$ is the variation in the propagation delay by which the phase of second clock signal 370 may differ from the phase of first clock signal 355.

In the embodiment shown in FIG. 3, second device 305 detects and compares the phase of first clock signal 355 and second clock signal 370 and modifies the phase of second clock signal source 360 such that the phases of first clock signal 355 and second clock signal 370 are in alignment. The embodiment also includes a third clock signal 375 that is transmitted from second device 305 to first device 300 using third clock connection 340, where the phase of third clock signal 375 is not modified. In addition to any other uses, third clock signal 375 is utilized by FIFO buffer 310.

Figure 4:
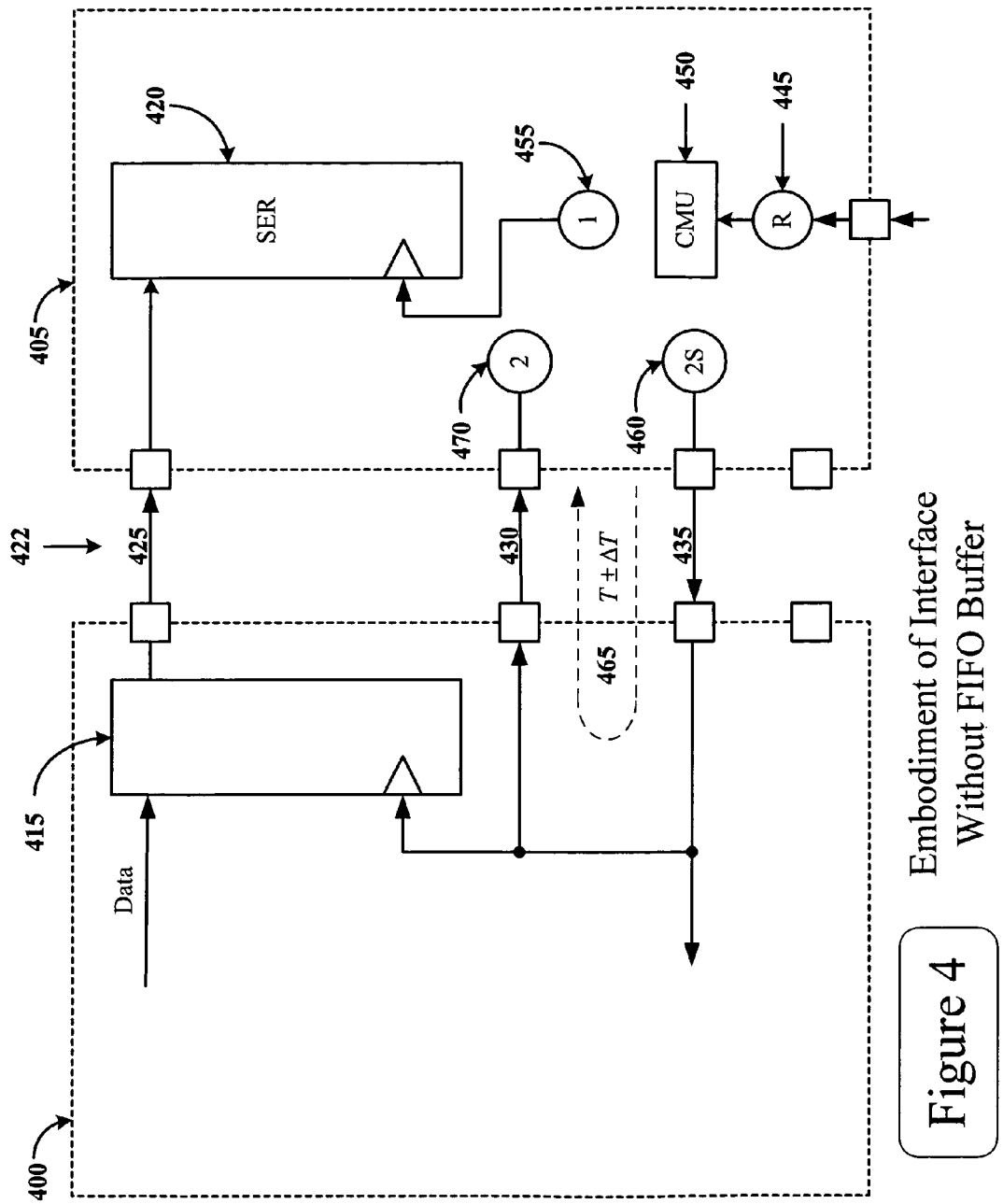
FIG. 4 is a diagram of a system embodiment that does not include a FIFO buffer.

An embodiment of an interface with a FIFO buffer is shown in FIG. 4. A first device 400 is interfaced with a second device 405. In this particular embodiment, first device 400 includes a control unit 415. In the embodiment, second device 405 includes a serializer unit 420. The interface 422 between first device 400 and second device 405 includes a data connection 425, which the first device 400 utilizes to transmit data to the second device 405. Note that while FIG. 4 only illustrates the data being transmitted from the first device to the second device, data may also be transmitted from the second device to the first device. The interface further includes a first clock connection 430 and a second clock connection 435.

In FIG. 4, second device 405 also receives an external reference clock 445, which second device 405 may use to generate clock signals through the use of a clock multiplier unit 450. As noted with regard to the embodiment shown in FIG. 3, the use of an external reference clock is not required and that an embodiment of dynamic phase alignment may be operated regardless of the method in which the core clock of second device 405 is generated. Serializer unit 420 is clocked by a first clock signal 455. Second device 405 then transmits a second clock signal source 460 to first device 400 using second clock connection 435. After second clock signal source 460 propagates through first device 400, a second clock signal 470 then is transmitted back from first device 400 to second device 405 using first clock connection 430. As second clock signal source 460 propagates through first device 400, there is a propagation delay 465 (a clock-out to data-in delay) of T±ΔT. Second clock signal 470 as received by the second device through clock connection 430 is delayed by a time period of T±ΔT. In the description of this embodiment, ±ΔT is the variation in the propagation delay by which the phase of second clock signal 470 may differ from the phase of first clock signal 455.

In the embodiment shown in FIG. 4, second device 405 detects and compares the phase of first clock signal 455 and second clock signal 470 and modifies the phase of second clock signal source 460 such that the phases of first clock signal 455 and second clock signal 470 are in alignment.

In another embodiment, there is a subsystem for correcting the clock relationship when a particular clock timing problem occurs. In an embodiment of a dynamic phase alignment interface that is operating properly, the first device delivers the second clock signal at a speed that is near the intended speed of the interface. During synchronization, the clock signal source that is provided by the second device may be higher than the target frequency of the interface, in which case the first device may not be capable of providing a clock signal at the required frequency and will therefore provide a signal at a clock speed that is slower than clock speed of the second clock signal source. In this case, a phase locked loop in the second device will see a clock frequency that is slower than it should be. This will tend to cause the control loop to increase the frequency of the counter clock to attempt to match the phases of the signals, thereby exasperating the problem because the relative difference in frequency between the second clock signal source and the second clock signal, which is at its maximum, will increase.

In one embodiment, the control loop controlling the counter clock is a charge-pump based phase locked loop. In general, the control loop can be implemented with any controlled oscillator with a control signal, with the control signal being a voltage, a current, or other signal. In a particular embodiment, the control signal is a control voltage for the voltage-controlled oscillator across a capacitor in a loop filter. In this particular embodiment, the control voltage may adjusted by sourcing or sinking charge to the capacitor. The charge-pump that drives the apparatus is controlled by the phase frequency detector, and the charge pump has a finite maximum output current or, if signs are reversed, a maximum input current. In more general terms for other embodiments, the charge pump and the phase frequency detector comprise a controller with a finite drive capacity.

In a particular embodiment involving a control voltage, if the control loop drives the control voltage to the edge of the range of the charge pump, as when the first device is not capable of producing a fast enough clock speed, this is detected by comparing the control voltage with a fixed reference voltage. Under one embodiment, the fixed reference voltage may be an upper supply voltage. When the control signal is close to the value of the signal the corresponds to the maximum frequency of the oscillator, then a correction is made to override the control loop. In a particular embodiment in which a control voltage is compared to a fixed reference voltage, when the control voltage is too high or too low, then a current source or sink is enabled to charge or discharge the capacitor in the control loop. Because in the given embodiment the current source or sink is more powerful than the charge pump, the control loop is overridden and the frequency of the clock is reduced. In a particular embodiment, the control voltage is driven back towards a lower supply voltage, thereby slowing the clock. When the control voltage gets close to the value of the lower supply voltage, the current source or sink is shut off and the control loop will again begin operation. At this point, the frequency of the second clock signal source is slower than the target frequency of the interface and the first device will be able to generate a valid clock. The clock generated will then be locked to the target frequency and the system will start adjusting for the phase variation.

Embodiments of dynamic phase aligning interfaces and devices may be used in numerous digital interface applications that include counter-clocking, especially in a system in which the receiving device is a high speed transmitter. Examples of possible applications include SONET (synchronous optical network) interfaces and Ethernet communication interfaces, especially in 10 gigabit Ethernet applications. Specific examples of embodiments are included in the Viking Serializer/Deserializer chipset and the GD16585 and GD16589 transmitter chips of GIGA ApS, a subsidiary of Intel Corporation of Santa Clara, Calif. However, a person of average skill in the arts will realize that embodiments may be implemented in other digital interface applications.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:
1. A method comprising:
  interfacing a first device with a second device;
  clocking at least a portion of the second device with a first clock signal;
  transmitting a clock signal source from the second device to the first device;

transmitting a second clock signal from the first device to the second device, wherein the second clock signal is the clock signal source delayed by a propagation delay;

adjusting a phase of the clock signal source such that a phase of the second clock signal is substantially in alignment with a phase of the first clock signal; and transmitting data clocked by the second clock signal from the first device to the second device.

2. The method of claim 1, wherein the second device is a high speed analog semiconductor device.

3. The method of claim 1, wherein the first device is a CMOS semiconductor device.

4. The method of claim 1, wherein the phase of the clock signal source is adjusted by modifying the frequency of the clock signal source.

5. The method of claim 1, wherein the data is transmitted from the second device to the first device without an initiation sequence.

6. The method of claim 1, further comprising receiving a reference clock signal, wherein the first clock signal and the clock signal source are generated from the reference clock signal.

7. The method of claim 1, further comprising reducing a frequency of the clock signal source if a frequency of the second clock signal is less than the frequency of the clock signal source.

8. A transmitter comprising:
a subpart that is clocked by a first clock signal;
a first interface connection to a device, the device transmitting data to the transmitter using the first interface connection;
a second interface connection to the device, the transmitter to transmit a clock signal source to the device using the second interface connection;
a third interface connection to the device, the device transmitting a second clock signal to the transmitter using the third interface connection, wherein the second clock signal is the clock signal source delayed by a propagation delay through a portion of the device; and
a phase detection unit, the phase detection unit adjusting the phase of the clock signal source to align the phase of the second clock signal with the phase of the first clock signal.

9. The transmitter of claim 8, further comprising a reference clock signal connection, the transmitter to receive a reference clock signal using the reference clock connection.

10. The transmitter of claim 9, further comprising a clock multiplier unit, the transmitter to use the clock multiplier unit to generate the first clock signal and the clock signal source from the reference clock signal.

11. The transmitter of claim 8, wherein the phase detection unit adjusts the phase of the clock signal source by adjusting the frequency of the clock signal source.

12. The transmitter of claim 8, wherein the transmitter reduces a frequency of the clock signal source if a frequency of the second clock signal is less than the frequency of the clock signal source.

13. The transmitter of claim 8, wherein the phase detection unit is a set-reset latch based phase frequency detector.

14. A self-synchronizing interface comprising:
a first interface connection between a first device and a second device, the second device transmitting a clock signal source to the first device through the first interface connection;
a second interface connection between the first device and the second device, the first device transmitting a first clock sianal that is a delayed version of the clock signal source to the second device, the second device modifying the phase of the clock signal source such that the phase of the first clock signal aligns with the phase of a second clock signal, wherein at least a portion of the second device is clocked by the second clock signal; and
a third interface connection between the first device and the second device, the first device transmitting data to the second device through the third interface connection, wherein the data is clocked by the delayed version of the first clock signal.

15. The interface of claim 14, wherein the second device modifies the phase of the clock signal source by modifying the frequency of the first clock signal.

16. The interface of claim 14, wherein the second device reduces a frequency of the first clock signal source if a frequency of the delayed version of the first clock signal is less than a frequency of the clock signal source.

17. A data communication system comprising;
a first subsystem, the first subsystem receiving a clock signal source, the first subsystem further transmitting data that is clocked by a first clock signal, the first clock signal being the clock signal source delayed by a propagation delay through at least a portion of the first subsystem; and
a second subsystem, the second subsystem transmitting the clock signal source to the first subsystem and receiving the data and the first clock signal from the first subsystem, at least a portion of the second subsystem being clocked by a second clock signal, the second subsystem modifying the phase of the clock signal source to align the phase of the first clock signal with the phase of the second clock signal.

18. The data communications system of claim 17, wherein the first subsystem includes a buffer memory.

19. The data communications system of claim 17, wherein the second subsystem operates at a higher speed than the first subsystem.

20. The data communications system of claim 17, wherein the second subsystem modifies the phase of the clock signal source by modifying the frequency of the clock signal source.

21. The data communications system of claim 17, wherein the second subsystem reduces the frequency of the clock signal source if the frequency of the first clock signal is below the frequency of the clock signal source.

22. The data communications system of claim 17, wherein the second subsystem includes a phase frequency detector.

23. The data communications system of claim 22, wherein the phase frequency detector is a set-reset latch based phase frequency detector.

24. A method comprising:
interfacing a first device with a second device;
generating a first clock signal and a clock signal source;
clocking at least a portion of the second device with the first clock signal;
transmitting the clock signal source from the second device to the first device;
generating a second clock signal, wherein the third clock signal is the clock signal source after propagating through a portion of the first device;
transmitting the second clock signal and data clocked by the second clock signal from the first device to the second device;

detecting phases and frequencies of the first clock signal and the second clock signal and comparing the phase of the first clock signal to the phase of the second clock signal; and if the phase of the first clock signal and the phase of the clock signal are not in alignment, modifying the phase of the clock signal source until the phase of the second clock signal is aligned with the phase of the first clock signal.

25. The method of claim 24, further comprising reducing a frequency of the clock signal source if the frequency of the second clock signal is below the frequency of the clock signal source.

26. The method of claim 25, wherein the frequency of the second clock signal is below the frequency of the clock signal source because the frequency of the clock signal source is above a maximum frequency that can be generated by the first device.

27. A method comprising:
coupling a first device with a second device;
clocking at least a portion of the second device with a first clock signal;
transmitting a clock signal source from the second device to the first device;
transmitting a second clock signal from the first device to the second device, wherein the second clock signal is the clock signal source delayed by a propagation delay;
detecting a difference between a phase of the first clock signal and a phase of the second clock signal;
adjusting a phase of the clock signal source to align the phase of the second clock signal with the phase of the first clock signal; and
transmitting data clocked by the second clock signal from the first device to the second device.

28. The method of claim 27, wherein adjusting the phase of the clock signal source comprises modifying the frequency of the clock signal source.

29. The method of claim 27, further comprising reducing a frequency of the clock signal source if a frequency of the second clock signal is less than the frequency of the clock signal source.

* * * * *